US012687704B2

(12) United States Patent
Zhou et al.

(10) Patent No.: US 12,687,704 B2
(45) Date of Patent: Jul. 21, 2026

(54) CAMERA OPTICAL LENS

(71) Applicant: Changzhou AAC Raytech Optronics Co., Ltd., Changzhou City (CN)

(72) Inventors: Shunda Zhou, Changzhou (CN); Shijia Zhao, Changzhou (CN); Zhen Huang, Changzhou (CN); Lu Pan, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 221 days.

(21) Appl. No.: 18/770,702

(22) Filed: Jul. 12, 2024

(65) Prior Publication Data

US 2025/0327995 A1     Oct. 23, 2025

(30) Foreign Application Priority Data

Apr. 19, 2024     (CN) .......................... 202410484527.X

(51) Int. Cl.
$G02B\ 13/00$          (2006.01)
$G02B\ 9/64$          (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/00; G02B 13/06; G02B 13/18; G02B 1/00
See application file for complete search history.

(56) References Cited

U.S. PATENT DOCUMENTS

| | | | |
|---|---|---|---|
| 11,243,383 B2 * | 2/2022 | Yamazaki | ................ G02B 9/64 |
| 2015/0268448 A1 * | 9/2015 | Kubota | .................... G02B 9/64 |
| | | | 359/755 |
| 2019/0155000 A1 * | 5/2019 | Hashimoto | ........ G02B 13/0045 |
| 2021/0063690 A1 * | 3/2021 | Huh | ......................... G02B 9/64 |
| 2022/0206255 A1 * | 6/2022 | Nitta | ................. G02B 13/0045 |
| 2023/0228974 A1 * | 7/2023 | Jung | .................. G02B 13/0045 |
| | | | 359/754 |
| 2025/0199270 A1 * | 6/2025 | Zhang | ..................... G02B 7/02 |

* cited by examiner

*Primary Examiner* — Balram T Parbadia
*Assistant Examiner* — John Curtis Sipes
(74) *Attorney, Agent, or Firm* — Wiersch Law Group

(57) ABSTRACT

The present disclosure relates to the field of optical lenses, and discloses a camera optical lens sequentially including seven lenses from an object-side to an image-side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power; and the following relational expressions are satisfied: $-18.000 \leq f1/f+f2/f+f3/f \leq -8.000$; $-1.800 \leq f4/f+f5/f+f6/f+f7/f \leq -0.600$; $-0.080 \leq d0/d1 \leq -0.050$. The camera optical lens according to the present disclosure has excellent optical performance, has the characteristics of miniaturization, wide-angle, and sufficient correction of aberration, and is particularly suitable for a mobile phone camera lens component, a web camera lens, and a vehicle-mounted lens composed of camera elements such as CCD, CMOS with high definition.

16 Claims, 9 Drawing Sheets longitudinal aberration lateral color

20 longitudinal aberration lateral color field curvature                                      distortion

30

CAMERA OPTICAL LENS

TECHNICAL FIELD

The present disclosure relates to the field of optical lens and, in particular, to a camera optical lens applicable to handheld terminal devices such as smart phones, digital cameras, and camera devices such as monitors and PC lenses, vehicle-mounted lenses.

BACKGROUND

In recent years, with the rise of various smart devices, the demand for a miniaturized camera optical lens has gradually increased, and since the pixel size of the optical sensor is reduced, and the current electronic product has a development trend of light weight, thin and portable, the miniaturized camera optical lens with good imaging quality has become the mainstream of the current market. In order to obtain better imaging quality, a multi-lens structure is mostly used. In addition, with the development of technology and the increase of diversified requirements of users, under the condition that the pixel area of the optical sensor is continuously reduced and the requirements on the imaging quality of the system are continuously improved, the structure with seven lenses gradually appears in the lens design. There is an urgent need for an optical camera lens having excellent optical performance, miniaturization, wide-angle and sufficient correction of aberration.

SUMMARY

In view of the above problems, an object of the present disclosure is to provide a camera optical lens which has excellent optical performance and meets design requirements of miniaturization, wide-angle and sufficient correction of aberration.

In order to achieve the above object, the technical solution of the present disclosure provides a camera optical lens, the camera optical lens sequentially includes a aperture stop and seven lenses from an object-side to an image-side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

an object-side surface of the first lens is convex in a paraxial region, and an image-side surface of the first lens is concave in the paraxial region; an object-side surface of the second lens is convex in the paraxial region, and an image-side surface of the second lens is concave in the paraxial region; an object-side surface of the third lens is concave in the paraxial region, and an image-side surface of the third lens is concave in the paraxial region; an object-side surface of the fourth lens is convex in the paraxial region; an object-side surface of the fifth lens is convex in the paraxial region, and an image-side surface of the fifth lens is concave in the paraxial region; an object-side surface of the sixth lens is convex in the paraxial region, and an image-side surface of the sixth lens is convex in the paraxial region; an object-side surface of the seventh lens is convex in the paraxial region, and an image-side surface of the seventh lens is concave in the paraxial region;

wherein, a focal length of the camera optical lens is f, a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, an on-axis distance from the aperture stop to the object-side surface of the first lens is d0, an on-axis thickness of the first lens is d1, a central curvature radius of the object-side surface of the fifth lens in the paraxial region is R9, a central curvature radius of the image-side surface of the fifth lens in the paraxial region is R10, a central curvature radius of the image-side surface of the sixth lens in the paraxial region is R12, a central curvature radius of the object-side surface of the seventh lens in the paraxial region is R13, a central curvature radius of the image-side surface of the seventh lens in the paraxial region is R14, and the following relational expressions are satisfied:

$$-18.000 \le f1/f + f2/f + f3/f \le -8.000;$$

$$-1.800 \le f4/f + f5/f + f6/f + f7/f \le -0.600;$$

$$-0.080 \le d0/d1 \le -0.050;$$

$$-8.000 \le R12/f6 \le -2.500;$$

$$-1.000 \le f4/f5 \le -0.500;$$

$$1.700 \le (R9 + R10)/f \le 2.600; \text{ and}$$

$$2.000 \le R13/R14 \le 6.000.$$

As an improvement, the following relational expression is satisfied: $-15.000 \le f1/f+f2/f+f3/f \le -9.000$.

As an improvement, the following relational expression is satisfied: $-1.500 \le f4/f+f5/f+f6/f+f7/f \le -0.700$.

As an improvement, an on-axis distance from the image-side surface of the fourth lens to the object-side surface of the fifth lens is d8, a total optical length from the object-side surface of the first lens to an image surface of the camera optical lens along an optic axis of the camera optical lens is TTL, where: $0.065 \le d8/TTL \le 0.120$.

As an improvement, the first lens is made of glass.

In order to achieve the above object, the technical solution of the present disclosure further provides a camera optical lens, the camera optical lens sequentially includes a aperture stop and seven lenses from an object-side to an image-side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

an object-side surface of the first lens is convex in a paraxial region, and an image-side surface of the first lens is concave in the paraxial region; an object-side surface of the second lens is convex in the paraxial region, and an image-side surface of the second lens is concave in the paraxial region; an object-side surface of the third lens is concave in the paraxial region, and an image-side surface of the third lens is concave in the paraxial region; an object-side surface of the fourth lens is convex in the paraxial region; an object-side surface of the fifth lens is convex in the paraxial region, and an image-side surface of the fifth lens is concave in the paraxial region; an object-side surface of the sixth lens is convex in the paraxial region, and an image-side surface of the sixth lens is convex in the paraxial region; an object-side surface of the seventh lens is convex in the paraxial region, and an image-side surface of the seventh lens is concave in the paraxial region;

wherein a focal length of the camera optical lens is f, a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, an on-axis distance from the aperture stop to the object-side surface of the first lens is d0, an on-axis thickness of the first lens is d1, a central curvature radius of the object-side surface of the first lens in the paraxial region is R1, a central curvature radius of the image-side surface of the first lens in the paraxial region is R2, a central curvature radius of the object-side surface of the seventh lens in the paraxial region is R13, a central curvature radius of the image-side surface of the seventh lens in the paraxial region is R14, a sum of the on-axis thicknesses of the first lens to the seventh lens is $\Sigma d$, a sum of the lengths of the air gaps between any two adjacent lenses between the first lens to the seventh lens on the optical axis is $\Sigma D$, and the following relational expressions are satisfied:

$$-18.000 \le f1/f + f2/f + f3/f \le -8.000;$$

$$-1.800 \le f4/f + f5/f + f6/f + f7/f \le -0.600;$$

$$-0.080 \le d0/d1 \le -0.050;$$

$$2.600 \le f1/R1 + f1/R2 \le 4.800;$$

$$0.600 \le (R13 + R14)/f \le 2.600; \text{ and}$$

$$0.600 \le \sum D / \sum d \le 0.950.$$

As an improvement, the following relational expression is satisfied: $-15.000 \le f1/f+f2/f+f3/f \le -9.000$.

As an improvement, the following relational expression is satisfied: $-1.500 \le f4/f+f5/f+f6/f+f7/f \le -0.700$.

As an improvement, the following relational expression is satisfied: $3.400 \le f1/R1+f1/R2 \le 4.000$.

As an improvement, the following relational expression is satisfied: $0.700 \le (R13+R14)/f \le 2.200$.

As an improvement, the following relational expression is satisfied: $0.630 \le \Sigma D/\Sigma d \le 0.920$.

As an improvement, a combined focal length of the first lens and the second lens is f12, a central curvature radius of the image-side surface of the second lens in the paraxial region is R4, and the following relational expression is satisfied: $-3.000 \le f12/(R1-R4) \le -1.300$.

As an improvement, the following relational expression is satisfied: $-2.600 \le f12/(R1-R4) \le -1.500$.

As an improvement, the following relational expression is satisfied: $0.007 \le d0/(R1-R2) \le 0.020$.

As an improvement, the following relational expression is satisfied: $0.008 \le d0/(R1-R2) \le 0.018$.

As an improvement, the first lens is made of glass.

The present disclosure has the following beneficial effects: The camera optical lens according to the present disclosure has excellent optical performance, has the characteristics of miniaturization, wide-angle, and sufficient correction of aberration, and is particularly suitable for a mobile phone camera lens component, a web camera lens, and a vehicle-mounted lens composed of camera elements such as CCD, CMOS with high definition.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
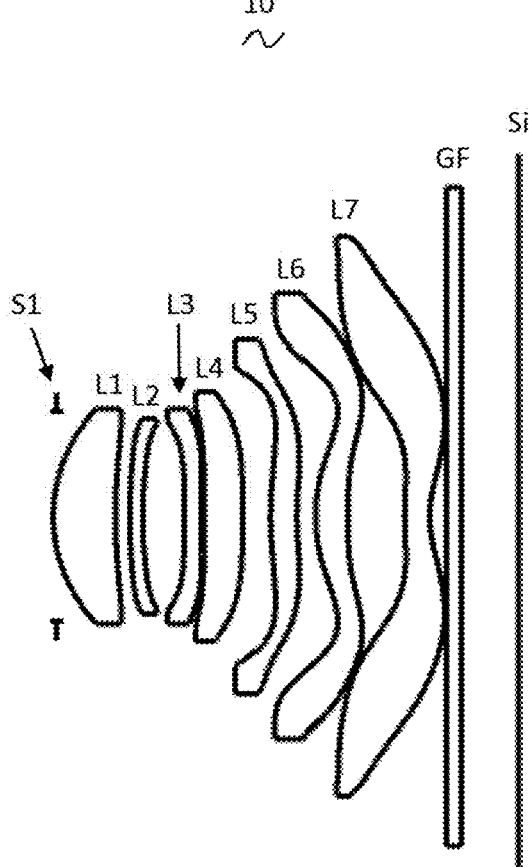
FIG. 1 is a structural schematic diagram of a camera optical lens according to Embodiment 1 of the present disclosure.

In order to more clearly illustrate objectives, technical solutions, and advantages of the embodiments of the present disclosure, the technical solutions in the embodiments of the present disclosure are clearly and completely described in details with reference to the drawings. The described embodiments are merely part of the embodiments of the present disclosure rather than all of the embodiments. All other embodiments obtained by those skilled in the art based on the embodiments of the present disclosure without paying creative labor shall fall into the protection scope of the present disclosure.

Referring to FIGS. 1-16, the technical solution of the present disclosure provides camera optical lenses 10, 20, 30 and 40. FIG. 1, FIG. 5, FIG. 9, and FIG. 13 show camera optical lenses 10, 20, 30, and 40 according to the present disclosure, and the camera optical lenses 10, 20, 30, and 40 include seven lenses. The camera optical lens sequentially includes from an object-side to an image-side: an aperture stop S1, a first lens L1, a second lens L2, a third lens L3, a fourth lens L4, a fifth lens L5, a sixth lens L6 and a seventh lens L7. An optical element such as a grating filter GF may be provided between the seventh lens L7 and an image plane Si.

The first lens L1 is made of glass, the second lens L2 is made of plastic material, the third lens L3 is made of plastic material, the fourth lens L4 is made of plastic material, the fifth lens L5 is made of plastic material, the sixth lens L6 is made of plastic material, and the seventh lens L7 is made of plastic material. The lenses may also be made of other materials.

The object-side surface and the image-side surface of the first lens L1, the second lens L2, the third lens L3, the fourth lens L4, the fifth lens L5, the sixth lens L6, and the seventh lens L7 are aspheric surfaces.

The refractive powers of the first lens L1, the second lens L2, the third lens L3, the fourth lens L4, the fifth lens L5, the sixth lens L6, and the seventh lens L7 are positive, negative, negative, positive, negative, positive, negative, respectively; the object-side surface of the first lens L1 is convex in the paraxial region, the image-side surface of the first lens L1 is concave in the paraxial region; the object-side surface of the second lens L2 is convex in the paraxial region, the image-side surface of the second lens L2 is concave in the paraxial region; the object-side surface of the third lens L3 is concave in the paraxial region, the image-side surface of the third lens L3 is concave in the paraxial region; the object-side surface of the fourth lens L4 is convex in the paraxial region, the image-side surface of the fourth lens L4 may be convex or concave in the paraxial region; the object-side surface of the fifth lens L5 is convex in the paraxial region, the image-side surface of the fifth lens L5 is concave in the paraxial region; the object-side surface of the sixth lens L6 is convex in the paraxial region, the image-side surface of the sixth lens L6 is convex in the paraxial region; and the object-side surface of the seventh lens L7 is convex in the paraxial region, the image-side surface of the seventh lens L7 is concave in the paraxial region.

A focal length of the camera optical lens is defined as f, a focal length of the first lens L1 is defined as f1, a focal length of the second lens L2 is defined as f2, a focal length of the third lens L3 is defined as f3, and the following relational expression is satisfied: $-18.000 \leq f1/f+f2/f+f3/f \leq -8.000$, within the range of the relational expression, it is beneficial to increase the field of view and realize wide-angle by reasonably controlling the refractive powers of the first three lenses. The following relational expression is satisfied: $-15.000 \leq f1/f+f2/f+f3/f \leq -9.000$.

A focal length of the fourth lens L4 is defined as f4, a focal length of the fifth lens L5 is defined as f5, a focal length of the sixth lens L6 is defined as f6, a focal length of the seventh lens L7 is defined as f7, and the following relational expression is satisfied: $-1.800 \leq f4/f+f5/f+f6/f+f7/f \leq -0.600$, within the range of the relational expression, it is beneficial to correct aberration and shorten the total optical length by reasonably controlling the refractive powers of the last four lenses. The following relational expression is satisfied: $-1.500 \leq f4/f+f5/f+f6/f+f7/f \leq -0.700$.

An on-axis distance from the aperture stop S1 to the object-side surface of the first lens L1 is defined as d0 (if a point on the object-side surface of the first lens L1 on the optical axis is closer to the object-side than a center point of the aperture stop S1, d0 is a negative value; if the point on the object-side surface of the first lens L1 on the optical axis is closer to the image-side than the center point of the aperture stop S1, d0 is a positive value), an on-axis thickness of the first lens L1 is defined as d1, and the following relational expression is satisfied: $-0.080 \leq d0/d1 \leq -0.050$, within the range of the relational expression, by reasonably controlling the position of the aperture stop and the on-axis thickness of the first lens, the camera optical lens has a higher light intake and the object-side surface of the first lens has a reasonable thickness, which is beneficial to improve the processing yield.

A central curvature radius of the image-side surface of the sixth lens L6 in the paraxial region is defined as R12, a focal length of the sixth lens L6 is defined as f6, and the following relational expression is satisfied: $-8.000 \leq R12/f6 \leq -2.500$, within the range of the relational expression, the influence of astigmatism on the camera optical lens may be reduced, thereby improving the imaging quality of the camera optical lens.

A focal length of the fourth lens L4 is defined as f4, a focal length of the fifth lens L5 is defined as f5, and the following relational expression is satisfied: $-1.000 \leq f4/f5 \leq -0.500$, within the range of the relational expression, the fifth lens may be configured with an appropriate refractive power to correct the aberration generated by the fourth lens, which helps improve the peripheral image quality.

A central curvature radius of the object-side surface of the fifth lens L5 in the paraxial region is defined as R9, a central curvature radius of the image-side surface of the fifth lens L5 in the paraxial region is defined as R10, a focal length of the camera optical lens is defined as f, and the following relational expression is satisfied: $1.700 \leq (R9+R10)/f \leq 2.600$, within the range of the relational expression, it is convenient to adjust and control the refractive power of the fifth lens, so that the fifth lens corrects the on-axis chromatic aberration and the off-axis lateral color of the light after passing through the fourth lens, thereby improving the imaging quality.

A central curvature radius of the object-side surface of the seventh lens L7 in the paraxial region is defined as R13, a central curvature radius of the image-side surface of the seventh lens L7 in the paraxial region is defined as R14, and the following relational expression is satisfied: $2.000 \leq R13/R14 \leq 6.000$, by controlling the ratio of the central curvature radius of the object-side surface of the seventh lens in the paraxial region to the central curvature radius of the image-side surface of the seventh lens in the paraxial region, within the range of the relational expression, the processability of the seventh lens is ensured, the aberration of the system is reduced, and the image quality is improved.

An on-axis distance from an image-side surface of the fourth lens L4 to an object-side surface of the fifth lens L5 is defined as d8, a total optical length from the object-side surface of the first lens to an image plane of the camera optical lens along an optic axis of the camera optical lens is defined as TTL, and the following relational expression is satisfied: $0.065 \leq d8/TTL \leq 0.120$, within the range of the relational expression, it is beneficial to shorten the total optical length of the camera optical lens.

A central curvature radius of the object-side surface of the first lens L1 in the paraxial region is defined as R1, a central curvature radius of the image-side surface of the first lens in the paraxial region is defined as R2, a focal length of the first lens L1 is defined as f1, and the following relational expression is satisfied: $2.600 \leq f1/R1+f1/R2 \leq 4.800$, within the range of the relational expression, the surface type and refractive power of the first lens may be adjusted, which helps compress the volume and increase the viewing angle. The following relational expression is satisfied: $3.400 \leq f1/R1+f1/R2 \leq 4.000$.

7

A central curvature radius of the object-side surface of the seventh lens L7 in the paraxial region is defined as R13, a central curvature radius of the image-side surface of the seventh lens L7 in the paraxial region is defined as R14, a focal length of the camera optical lens is defined as f, and the following relational expression is satisfied: $0.600 \leq (R13+R14)/f \leq 2.600$, within the range of the relational expression, by reasonably controlling the relationship between the central curvature radius and the focal length in the paraxial region of the seventh lens, it is beneficial for the seventh lens to better correct the aberration and improve the imaging quality of the camera optical lens. The following relational expression is satisfied: $0.700 \leq (R13+R14)/f \leq 2.200$.

A sum of on-axis thicknesses of the first lens L1 to the seventh lens L7 is defined as $\Sigma d$, a sum of lengths of air gaps between any two adjacent lenses between the first lens L1 to the seventh lens L7 on the optical axis is defined as $\Sigma D$, and the following relational expression is satisfied: $0.600 \leq \Sigma D/\Sigma d \leq 0.950$, within the range of the relational expression, by reasonably controlling the air gaps between each adjacent lens and the on-axis thickness of each lens, it is beneficial to shorten the total optical length and achieve ultra-thin. The following relational expression is satisfied: $0.630 \leq \Sigma D/\Sigma d \leq 0.920$.

A combined focal length of the first lens L1 and the second lens L2 is defined as f12, a central curvature radius of the image-side surface of the second lens L2 in the paraxial region is defined as R4, and the following relational expression is satisfied: $-3.000 \leq f12/(R1-R4) \leq -1.300$, within the range of the relational expression, by reasonably configuring the combined focal length and surface shapes of the first lens and the second lens, chromatic aberration is eliminated, spherical aberration is reduced, astigmatism is corrected, and resolving power is improved. The following relational expression is satisfied: $-2.600 \leq f12/(R1-R4) \leq -1.500$.

A central curvature radius of the object-side surface of the first lens L1 in the paraxial region is defined as R1, a central curvature radius of the image-side surface of the first lens L1 in the paraxial region is defined as R2, an on-axis distance from the aperture stop to the object-side surface of the first lens is defined as d0, and the following relational expression is satisfied: $0.007 \leq d0/(R1-R2) \leq 0.020$, within the range of the relational expression, the aperture stop is protruding, and the outer space of the aperture is larger, which is beneficial to the structural design of the variable aperture. The following relational expression is satisfied: $0.008 \leq d0/(R1-R2) \leq 0.018$.

The first lens L1 is made of glass, and the glass lens is matched with the resin lens to reduce chromatic aberration and improve performance of the optical camera lens.

Compared with the prior art, the camera optical lens provided by the disclosure is configured with $-18.000 \leq f1/f+f2/f+f3/f \leq -8.000$; $-1.800 \leq f4/f+f5/f+f6/f+f7/f \leq -0.600$; $-0.080 \leq d0/d1 \leq -0.050$; $-8.000 \leq R12/f6 \leq -2.500$; $-1.000 \leq f4/f5 \leq -0.500$; $1.700 \leq (R9+R10)/f \leq 2.600$; $2.000 \leq R13/R14 \leq 6.000$, which is beneficial to increase the field of view, realize wide-angle, in addition, is beneficial to correct aberration; and the camera optical lens has a higher light intake, the object-side surface of the first lens has a reasonable thickness, which is beneficial to increase the processing yield. In addition, it is also beneficial to reduce the influence of astigmatism on the camera optical lens, thereby improving the imaging quality of the camera optical lens; the fifth lens is configured with a suitable refractive power to correct aberrations such as the on-axis chromatic aberration and the off-axis lateral color aberration, which helps improve the peripheral imaging quality; and the processability of the seventh lens is ensured.

In addition, compared with the prior art, the present disclosure may also be configured with $-18.000 \leq f1/f+f2/f+f3/f \leq -8.000$; $-1.800 \leq f4/f+f5/f+f6/f+f7/f \leq -0.600$; $-0.080 \leq d0/d1 \leq -0.050$; $2.600 \leq f1/R1+f1/R2 \leq 4.800$; $0.600 \leq (R13+R14)/f \leq 2.600$; $0.600 \leq \Sigma D/\Sigma d \leq 0.950$, which is beneficial to increase the field of view, realize wide-angle, meet miniaturization, correct aberration, and improve the imaging quality of the camera optical lens; and the camera optical lens has a higher light intake, in addition, the object-side surface of the first lens has a reasonable thickness, which is beneficial to improve the processing yield.

The camera optical lens of the present disclosure will be described below with examples. The reference signs recited in each example are shown below. The units of focal length, on-axis distance, central curvature radius and on-axis thickness are mm.

TTL: total optical length (an on-axis distance from the object-side surface of the first lens L1 to the image surface Si of the camera optical lense), in mm;

F-Number FNO: refers to the ratio of the effective focal length of the camera optical lens to the entrance pupil diameter of the camera optical lens.

The technical solutions of the present disclosure will be described in detail in four embodiments, the technical effect of the disclosure cannot be realized when the range of the above relational expression is exceeded.

Embodiment 1

Table 1 and Table 2 show design data of the camera optical lens 10 according to Embodiment 1 of the present disclosure.

TABLE 1

|  | R |  | d | nd |  | vd |  |
|---|---|---|---|---|---|---|---|
| S1 | ∞ | d0= | −0.069 |  |  |  |  |
| R1 | 3.468 | d1= | 1.317 | nd1 | 1.4959 | v1 | 81.65 |
| R2 | 12.094 | d2= | 0.300 |  |  |  |  |
| R3 | 11.257 | d3= | 0.275 | nd2 | 1.6700 | v2 | 19.39 |
| R4 | 9.433 | d4= | 0.884 |  |  |  |  |
| R5 | −71.151 | d5= | 0.348 | nd3 | 1.6700 | v3 | 19.39 |
| R6 | 37.241 | d6= | 0.062 |  |  |  |  |
| R7 | 144.113 | d7= | 0.814 | nd4 | 1.5444 | v4 | 55.82 |
| R8 | 433.333 | d8= | 0.608 |  |  |  |  |
| R9 | 7.086 | d9= | 0.556 | nd5 | 1.5661 | v5 | 37.71 |
| R10 | 6.677 | d10= | 0.399 |  |  |  |  |
| R11 | 4.264 | d11= | 0.690 | nd6 | 1.5444 | v6 | 55.82 |
| R12 | −58.365 | d12= | 1.194 |  |  |  |  |
| R13 | 7.900 | d13= | 0.525 | nd7 | 1.5346 | v7 | 55.69 |
| R14 | 2.357 | d14= | 0.368 |  |  |  |  |
| R15 | ∞ | d15= | 0.310 | ndg | 1.5168 | vg | 64.17 |
| R16 | ∞ | d16= | 1.212 |  |  |  |  |

The meaning of each reference sign is as follows.

S1: aperture stop;

R: curvature radius at the center of the optical plane;

R1: central curvature radius of the object-side surface of the first lens L1 in the paraxial region;

R2: central curvature radius of the image-side surface of the first lens L1 in the paraxial region;

R3: central curvature radius of the object-side surface of the second lens L2 in the paraxial region;

R4: central curvature radius of the image-side surface of the second lens L2 in the paraxial region;

R5: central curvature radius of the object-side surface of the third lens L3 in the paraxial region;
R6: central curvature radius of the image-side surface of the third lens L3 in the paraxial region;
R7: central curvature radius of the object-side surface of the fourth lens L4 in the paraxial region;
R8: central curvature radius of the image-side surface of the fourth lens L4 in the paraxial region;
R9: central curvature radius of the object-side surface of the fifth lens L5 in the paraxial region;
R10: central curvature radius of the image-side surface of the fifth lens L5 in the paraxial region;
R11: central curvature radius of the object-side surface of the sixth lens L6 in the paraxial region;
R12: central curvature radius of the image-side surface of the sixth lens L6 in the paraxial region;
R13: central curvature radius of the object-side surface of the seventh lens L7 in the paraxial region;
R14: central curvature radius of the image-side surface of the seventh lens L7 in the paraxial region;
R15: central curvature radius of the object-side surface of the grating filter GF in the paraxial region;
R16: central curvature radius of the image-side surface of the grating filter GF in the paraxial region;
d: on-axis thickness of lenses, on-axis distance between lenses;
d0: on-axis distance from the aperture stop S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;

d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the grating filter GF;
d15: on-axis thickness of the grating filter GF;
d16: on-axis distance from the image-side surface of the grating filter GF to the image surface Si;
nd: refractive index of d line (the d line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the grating filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the grating filter GF.
Table 2 shows aspheric surface data of each lens in the camera optical lens 10 according to Embodiment 1 of the present disclosure.

TABLE 2

| | Conic Coefficient | Aspheric Coefficient | | | | |
|---|---|---|---|---|---|---|
| | k | A4 | A6 | A8 | A10 | A12 |
| R1 | 4.9545E−02 | −1.3182E−03 | 3.7026E−03 | −4.5874E−03 | 3.0093E−03 | −1.1704E−03 |
| R2 | 1.0633E−01 | −1.9663E−03 | −2.4895E−03 | 3.6361E−03 | −2.9583E−03 | 1.4098E−03 |
| R3 | 1.0177E+00 | −6.4295E−03 | 2.1052E−03 | −1.8160E−03 | 1.6942E−03 | −8.3437E−04 |
| R4 | 2.3375E−01 | −4.0553E−03 | 2.7812E−03 | −3.7202E−03 | 3.9092E−03 | −2.2977E−03 |
| R5 | 7.6668E+02 | −6.7906E−03 | −4.7211E−03 | 2.0760E−03 | −1.4530E−03 | 7.0207E−04 |
| R6 | −1.3214E+00 | 4.6192E−03 | −1.3268E−02 | 6.5600E−03 | −2.4720E−03 | 6.8013E−04 |
| R7 | 1.6470E+02 | 2.3351E−03 | −8.6473E−03 | 2.5330E−03 | 3.9727E−04 | −4.5760E−04 |
| R8 | −7.2499E+02 | −1.3819E−02 | 1.9798E−03 | −1.7447E−03 | 9.0270E−04 | −2.7243E−04 |
| R9 | −3.1928E+00 | −1.8088E−02 | 1.4221E−03 | 3.0298E−03 | −2.2591E−03 | 7.3356E−04 |
| R10 | −8.3764E−01 | −1.9371E−02 | −1.6152E−02 | 1.5109E−02 | −7.3072E−03 | 2.4200E−03 |
| R11 | −1.1795E+00 | 3.0739E−02 | −2.2872E−02 | 9.6634E−03 | −3.3610E−03 | 8.6953E−04 |
| R12 | 9.3045E+01 | 4.6050E−02 | −7.0211E−03 | −2.1891E−03 | 1.1686E−03 | −2.6470E−04 |
| R13 | −8.2284E−01 | −4.8859E−02 | 7.7153E−03 | −1.1389E−03 | 1.4717E−04 | −1.2012E−05 |
| R14 | −1.0187E+00 | −6.4053E−02 | 1.4622E−02 | −2.9549E−03 | 4.6757E−04 | −5.5095E−05 |

| | Conic Coefficient | Aspheric Coefficient | | | | |
|---|---|---|---|---|---|---|
| | k | A14 | A16 | A18 | A20 | A22 |
| R1 | 4.9545E−02 | 2.7747E−04 | −3.9478E−05 | 3.0967E−06 | −1.0309E−07 | 0.0000E+00 |
| R2 | 1.0633E−01 | −4.0430E−04 | 6.8935E−05 | −6.4530E−06 | 2.5518E−07 | 0.0000E+00 |
| R3 | 1.0177E+00 | 2.5060E−04 | −4.4728E−05 | 4.3958E−06 | −1.8469E−07 | 0.0000E+00 |
| R4 | 2.3375E−01 | 8.3068E−04 | −1.8014E−04 | 2.1514E−05 | −1.0761E−06 | 0.0000E+00 |
| R5 | 7.6668E+02 | −2.1495E−04 | 3.9650E−05 | −3.8598E−06 | 1.5312E−07 | |

TABLE 2-continued

| R6 | −1.3214E+00 | −1.2797E−04 | 1.4215E−05 | −6.4052E−07 | −4.6348E−09 | 0.0000E+00 |
|---|---|---|---|---|---|---|
| R7 | 1.6470E+02 | 1.3603E−04 | −2.1448E−05 | 1.8488E−06 | −6.8158E−08 | 0.0000E+00 |
| R8 | −7.2499E+02 | 5.1648E−05 | −5.9505E−06 | 3.6050E−07 | −7.9281E−09 | 0.0000E+00 |
| R9 | −3.1928E+00 | −7.9520E−05 | −3.0151E−05 | 1.5568E−05 | −3.5220E−06 | 4.8629E−07 |
| R10 | −8.3764E−01 | −5.8265E−04 | 1.0333E−04 | −1.3514E−05 | 1.2972E−06 | −9.0101E−08 |
| R11 | −1.1795E+00 | −1.6116E−04 | 2.1309E−05 | −2.0235E−06 | 1.3871E−07 | −6.8321E−09 |
| R12 | 9.3045E+01 | 3.7888E−05 | −3.7841E−06 | 2.7507E−07 | −1.4789E−08 | 5.8548E−10 |
| R13 | −8.2284E−01 | 4.6461E−07 | 7.5632E−09 | −1.9160E−09 | 1.1039E−10 | −3.6033E−12 |
| R14 | −1.0187E+00 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 4.9545E−02 | 0.0000E+00 | 0.0000E+00 | 0.0000E+00 | 0.0000E+00 | / |
| R2 | 1.0633E−01 | 0.0000E+00 | 0.0000E+00 | 0.0000E+00 | 0.0000E+00 | / |
| R3 | 1.0177E+00 | 0.0000E+00 | 0.0000E+00 | 0.0000E+00 | 0.0000E+00 | / |
| R4 | 2.3375E−01 | 0.0000E+00 | 0.0000E+00 | 0.0000E+00 | 0.0000E+00 | / |
| R5 | 7.6668E+02 | 0.0000E+00 | 0.0000E+00 | 0.0000E+00 | 0.0000E+00 | / |
| R6 | −1.3214E+00 | 0.0000E+00 | 0.0000E+00 | 0.0000E+00 | 0.0000E+00 | / |
| R7 | 1.6470E+02 | 0.0000E+00 | 0.0000E+00 | 0.0000E+00 | 0.0000E+00 | / |
| R8 | −7.2499E+02 | 0.0000E+00 | 0.0000E+00 | 0.0000E+00 | 0.0000E+00 | / |
| R9 | −3.1928E+00 | −4.3206E−08 | 2.4160E−09 | −7.7445E−11 | 1.0846E−12 | / |
| R10 | −8.3764E−01 | 4.4007E−09 | −1.4314E−10 | 2.7806E−12 | −2.4377E−14 | / |
| R11 | −1.1795E+00 | 2.3679E−10 | −5.5000E−12 | 7.7044E−14 | −4.9281E−16 | / |
| R12 | 9.3045E+01 | −1.6627E−11 | 3.2028E−13 | −3.7386E−15 | 1.9903E−17 | / |
| R13 | −8.2284E−01 | 7.3591E−14 | −9.2830E−16 | 6.5708E−18 | −1.9643E−20 | / |
| R14 | −1.0187E+00 | −1.8904E−13 | 2.0927E−15 | −1.3728E−17 | 4.0358E−20 | / |

For convenience, the aspheric surface of each lens surface uses the aspheric surface shown in the following formula (1). However, the present disclosure is not limited to the aspheric polynomial form shown in formula (1).

$$z = \left(cr^2\right)/\left\{1 + \left[1 - (k+1)\left(c^2 r^2\right)\right]^{1/2}\right\} + A4r^4 + A6r^6 + \quad (1)$$
$$A8r^8 + A10r^{10} + A12r^{12} + A14r^{14} + A16r^{16} + A18r^{18} +$$
$$A20r^{20} + A22r^{22} + A24r^{24} + A26r^{26} + A28r^{28} + A30r^{30}$$

k is a conic coefficient, A4, A6, A8, A10, A12, A14, A16, A18, A20, A22, A24, A26, A28 and A30 are aspheric coefficients, c is a curvature at a center of an optical surface, r is a vertical distance between a point on an aspheric curve and an optical axis, and z is an aspheric depth (a vertical distance between a point on the aspheric surface and the optical axis, where r is a distance from the point on the aspheric surface to the optical axis, and a vertical distance between the point on the aspheric surface and a tangent plane tangent to a vertex on the aspheric optical axis).

Figure 2:
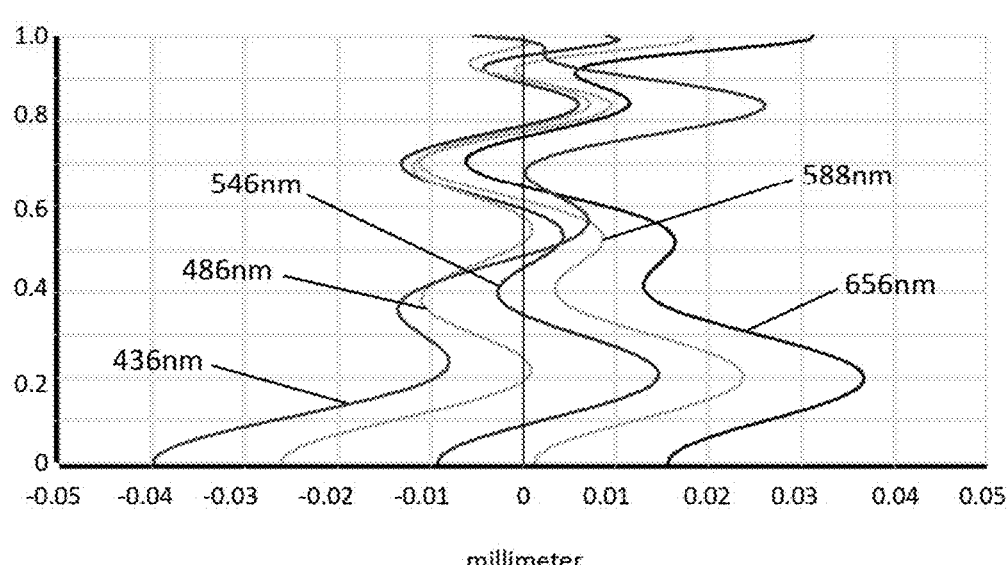
FIG. 2 is a schematic diagram of longitudinal aberration of the camera optical lens shown in FIG. 1.
Figure 3:
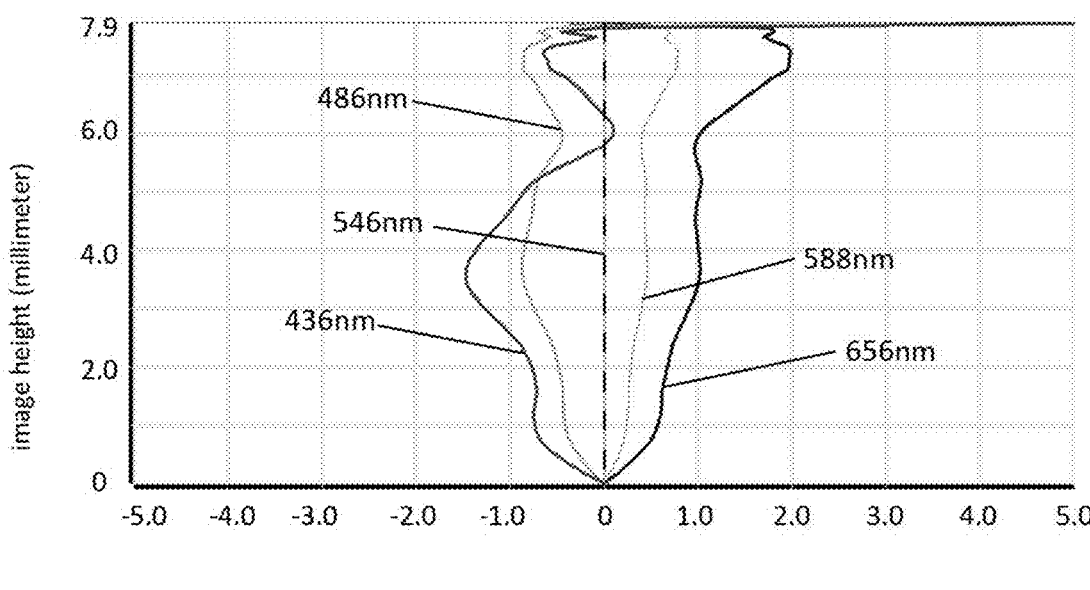
FIG. 3 is a schematic diagram of lateral color of the camera optical lens shown in FIG. 1.
Figure 4:
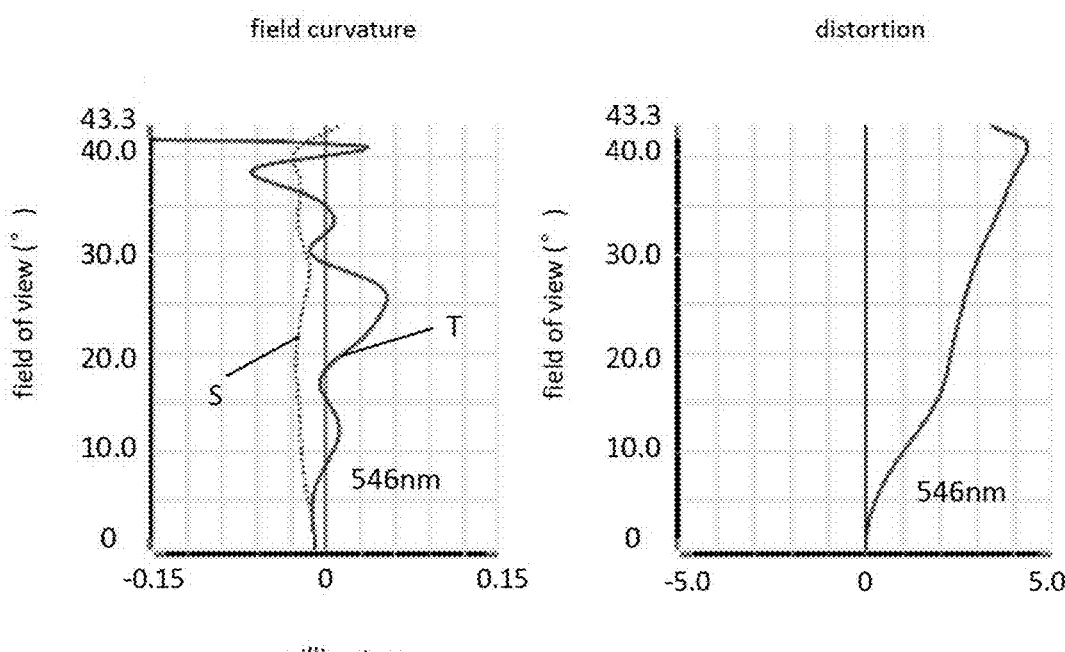
FIG. 4 is a schematic diagram of field curvature and distortion of the camera optical lens shown in FIG. 1.

FIG. 2 and FIG. 3 respectively show longitudinal aberration and lateral color of light with wavelengths of 656 nm, 588 nm, 546 nm, 486 nm and 436 nm after passing through the camera optical lens 10 according to Embodiment 1. FIG. 4 shows field curvature and distortion of light with wavelength 546 nm after passing through the camera optical lens 10 according to Embodiment 1, the field curvature S in FIG. 4 is the field curvature in the sagittal direction, and T is the field curvature in the meridian direction.

In the embodiment, the entrance pupil diameter ENPD of the camera optical lens 10 is 4.614 mm, 1.0 field of view image height IH is 7.900 mm, the MIC field of view image height is 8.100 mm, the field of view FOV of the 1.0 field of view in a diagonal direction is 86.60°, the field of view FOV of the MIC field of view in a diagonal direction is 88.18°, the camera optical lens 10 meets the design requirements of miniaturization, wide-angle and the aberrations are sufficiently corrected and have excellent optical characteristics.

It may be understood that the 1.0 field of view image height refers to half of the diagonal length of an effective pixel area of the sensor; the MIC field of view image height refers to a field of view height that is expanded from the 1.0 field of view image height and is used to prevent assembly deviation; the FOV in the diagonal direction of the 1.0 field of view refers to the field of view corresponding to the effective pixel area of the sensor; and the FOV in the diagonal direction of the MIC field of view refers to a field of view corresponding to the MIC field of view image height.

Embodiment 2

The meaning of the reference signs of Embodiment 2 is the same as that of Embodiment 1.

Figure 5:
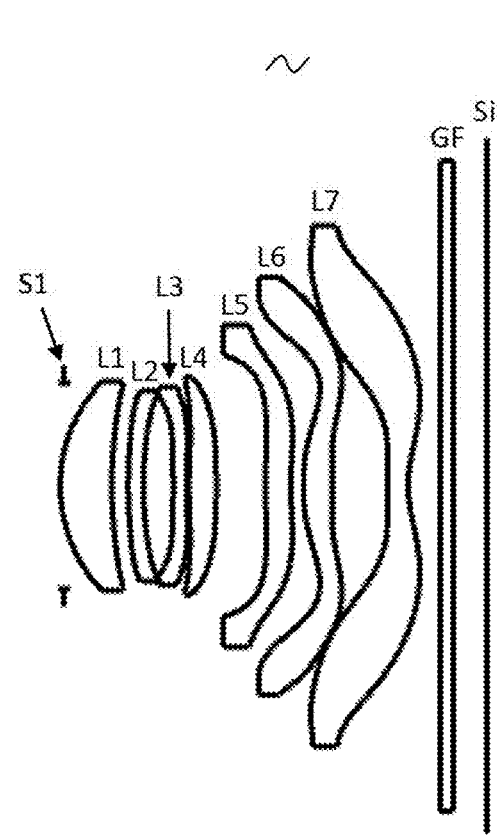
FIG. 5 is a structural schematic diagram of a camera optical lens according to Embodiment 2 of the present disclosure.

FIG. 5 shows a camera optical lens 20 according to Embodiment 2 of the present disclosure.

Table 3 and Table 4 show design data of the camera optical lens 20 according to Embodiment 2 of the present disclosure.

TABLE 3

| | R | | d | | nd | | vd |
|---|---|---|---|---|---|---|---|
| S1 | ∞ | d0= | −0.094 | | | | |
| R1 | 3.464 | d1= | 1.176 | nd1 | 1.4959 | v1 | 81.65 |
| R2 | 9.954 | d2= | 0.370 | | | | |
| R3 | 10.013 | d3= | 0.348 | nd2 | 1.6700 | v2 | 19.39 |
| R4 | 8.024 | d4= | 0.678 | | | | |
| R5 | −70.438 | d5= | 0.309 | nd3 | 1.6700 | v3 | 19.39 |
| R6 | 19.795 | d6= | 0.051 | | | | |
| R7 | 11.954 | d7= | 0.623 | nd4 | 1.5444 | v4 | 55.82 |
| R8 | −24.003 | d8= | 1.121 | | | | |
| R9 | 13.807 | d9= | 0.572 | nd5 | 1.5661 | v5 | 37.71 |
| R10 | 7.347 | d10= | 0.295 | | | | |
| R11 | 5.039 | d11= | 0.665 | nd6 | 1.5444 | v6 | 55.82 |
| R12 | −18.296 | d12= | 1.261 | | | | |
| R13 | 15.199 | d13= | 0.468 | nd7 | 1.5346 | v7 | 55.69 |
| R14 | 2.534 | d14= | 0.722 | | | | |

13

TABLE 3-continued

| | R | d | | nd | | νd |
|---|---|---|---|---|---|---|
| R15 | ∞ | d15= | 0.310 | ndg | 1.5168 | vg | 64.17 |
| R16 | ∞ | d16= | 0.769 | | | |

Table 4 shows aspheric surface data of each lens in the camera optical lens 20 according to Embodiment 2 of the present disclosure.

TABLE 4

| | Conic Coefficient | Aspheric Coefficient | | | | |
|---|---|---|---|---|---|---|
| | k | A4 | A6 | A8 | A10 | A12 |
| R1 | −4.2208E−02 | −1.6122E−03 | 3.9328E−03 | −4.6162E−03 | 3.0053E−03 | −1.1670E−03 |
| R2 | −2.2571E−01 | −1.9910E−03 | −2.2869E−03 | 3.6761E−03 | −2.9677E−03 | 1.4127E−03 |
| R3 | −4.5728E+00 | −6.1343E−03 | 2.1569E−03 | −1.8866E−03 | 1.7082E−03 | −8.3612E−04 |
| R4 | −1.1498E+00 | −3.8384E−03 | 2.7214E−03 | −3.7679E−03 | 3.8901E−03 | −2.2988E−03 |
| R5 | 4.8984E+02 | −3.8953E−03 | −5.0691E−03 | 2.0165E−03 | −1.4434E−03 | 7.0132E−04 |
| R6 | −9.9696E+02 | 3.3091E−03 | −1.3185E−02 | 6.5869E−03 | −2.4534E−03 | 6.8011E−04 |
| R7 | −3.1354E+02 | 8.3994E−04 | −8.5788E−03 | 2.5842E−03 | 4.1848E−04 | −4.5706E−04 |
| R8 | 8.7957E+01 | −1.1167E−02 | 2.0126E−03 | −1.7320E−03 | 9.0242E−04 | −2.7298E−04 |
| R9 | 1.4362E+00 | −1.9535E−02 | 1.6385E−03 | 3.0197E−03 | −2.2661E−03 | 7.3367E−04 |
| R10 | −2.9253E+00 | −2.0261E−02 | −1.6210E−02 | 1.5114E−02 | −7.3070E−03 | 2.4200E−03 |
| R11 | −1.1994E+00 | 3.1177E−02 | −2.2867E−02 | 9.6614E−03 | −3.3611E−03 | 8.6953E−04 |
| R12 | −1.2444E+02 | 4.5741E−02 | −7.0507E−03 | −2.1840E−03 | 1.1684E−03 | −2.6471E−04 |
| R13 | −2.2695E−02 | −4.7784E−02 | 7.6976E−03 | −1.1391E−03 | 1.4717E−04 | −1.2012E−05 |
| R14 | −9.9402E−01 | −6.3417E−02 | 1.4606E−02 | −2.9554E−03 | 4.6757E−04 | −5.5096E−05 |

| | Conic Coefficient | Aspheric Coefficient | | | | |
|---|---|---|---|---|---|---|
| | k | A14 | A16 | A18 | A20 | A22 |
| R1 | −4.2208E−02 | 2.7717E−04 | −3.9503E−05 | 3.1089E−06 | −1.0400E−07 | 0.0000E+00 |
| R2 | −2.2571E−01 | −4.0421E−04 | 6.8943E−05 | −6.4657E−06 | 2.5586E−07 | 0.0000E+00 |
| R3 | −4.5728E+00 | 2.5033E−04 | −4.4797E−05 | 4.4205E−06 | −1.8780E−07 | 0.0000E+00 |
| R4 | −1.1498E+00 | 8.3164E−04 | −1.8016E−04 | 2.1490E−05 | −1.0863E−06 | 0.0000E+00 |
| R5 | 4.8984E+02 | −2.1566E−04 | 3.9830E−05 | −3.9120E−06 | 1.5903E−07 | 0.0000E+00 |
| R6 | −9.9696E+02 | −1.2835E−04 | 1.4192E−05 | −6.4943E−07 | −2.0455E−09 | 0.0000E+00 |
| R7 | −3.1354E+02 | 1.3523E−04 | −2.1391E−05 | 1.8231E−06 | −6.5864E−08 | 0.0000E+00 |
| R8 | 8.7957E+01 | 5.1441E−05 | −5.9221E−06 | 3.6370E−07 | −8.8617E−09 | 0.0000E+00 |
| R9 | 1.4362E+00 | −7.9464E−05 | −3.0147E−05 | 1.5567E−05 | −3.5220E−06 | 4.8628E−07 |
| R10 | −2.9253E+00 | −5.8265E−04 | 1.0333E−04 | −1.3514E−05 | 1.2972E−06 | −9.0101E−08 |
| R11 | −1.1994E+00 | −1.6116E−04 | 2.1309E−05 | −2.0235E−06 | 1.3871E−07 | −6.8321E−09 |
| R12 | −1.2444E+02 | 3.7889E−05 | −3.7841E−06 | 2.7507E−07 | −1.4789E−08 | 5.8548E−10 |
| R13 | −2.2695E−02 | 4.6461E−07 | 7.5633E−09 | −1.9160E−09 | 1.1039E−10 | −3.6033E−12 |
| R14 | −9.9402E−01 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | −4.2208E−02 | 0.0000E+00 | 0.0000E+00 | 0.0000E+00 | 0.0000E+00 | / |
| R2 | −2.2571E−01 | 0.0000E+00 | 0.0000E+00 | 0.0000E+00 | 0.0000E+00 | / |
| R3 | −4.5728E+00 | 0.0000E+00 | 0.0000E+00 | 0.0000E+00 | 0.0000E+00 | / |
| R4 | −1.1498E+00 | 0.0000E+00 | 0.0000E+00 | 0.0000E+00 | 0.0000E+00 | / |
| R5 | 4.8984E+02 | 0.0000E+00 | 0.0000E+00 | 0.0000E+00 | 0.0000E+00 | / |
| R6 | −9.9696E+02 | 0.0000E+00 | 0.0000E+00 | 0.0000E+00 | 0.0000E+00 | / |
| R7 | −3.1354E+02 | 0.0000E+00 | 0.0000E+00 | 0.0000E+00 | 0.0000E+00 | / |
| R8 | 8.7957E+01 | 0.0000E+00 | 0.0000E+00 | 0.0000E+00 | 0.0000E+00 | / |
| R9 | 1.4362E+00 | −4.3206E−08 | 2.4160E−09 | −7.7444E−11 | 1.0848E−12 | / |
| R10 | −2.9253E+00 | 4.4007E−09 | −1.4314E−10 | 2.7806E−12 | −2.4377E−14 | / |
| R11 | −1.1994E+00 | 2.3679E−10 | −5.5000E−12 | 7.7045E−14 | −4.9280E−16 | / |
| R12 | −1.2444E+02 | −1.6627E−11 | 3.2028E−13 | −3.7386E−15 | 1.9904E−17 | / |
| R13 | −2.2695E−02 | 7.3591E−14 | −9.2830E−16 | 6.5708E−18 | −1.9643E−20 | / |
| R14 | −9.9402E−01 | −1.8904E−13 | 2.0927E−15 | −1.3729E−17 | 4.0357E−20 | / |

Figure 6:
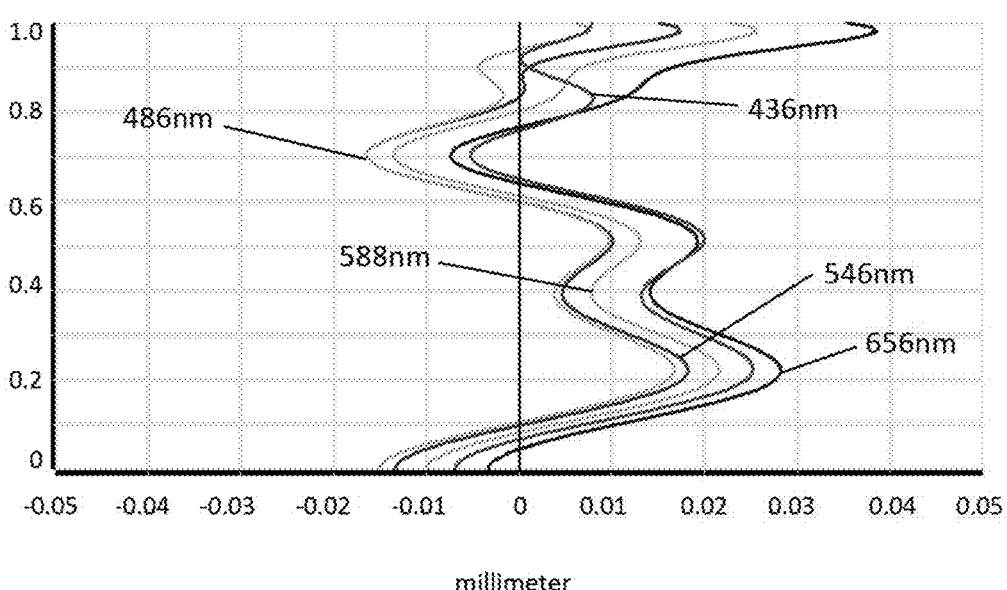
FIG. 6 is a schematic diagram of longitudinal aberration of the camera optical lens shown in FIG. 5.
Figure 7:
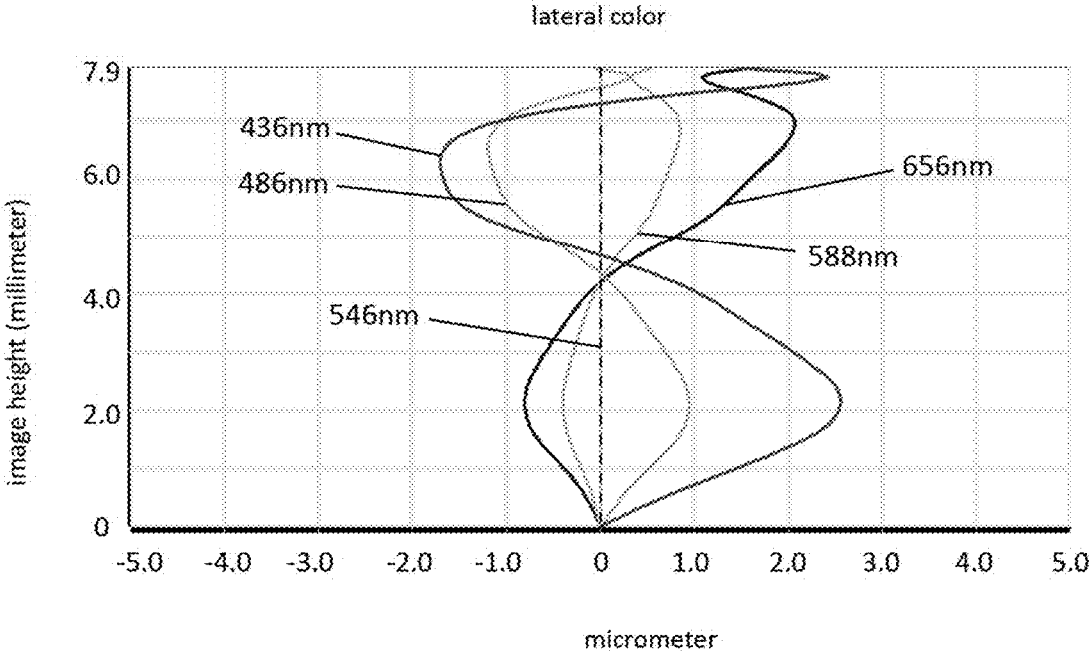
FIG. 7 is a schematic diagram of lateral color of the camera optical lens shown in FIG. 5.
Figure 8:
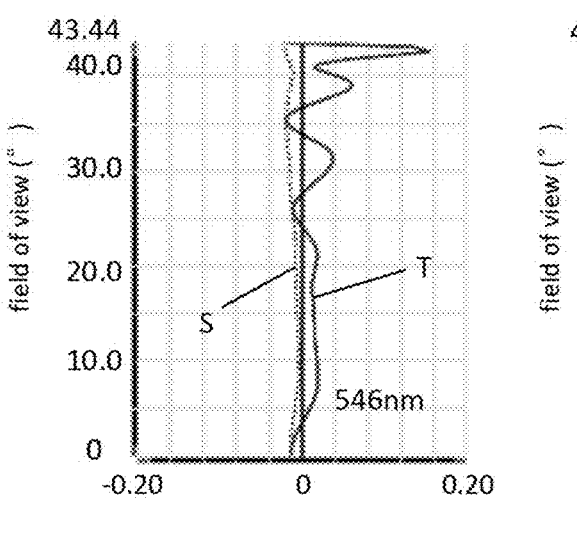
FIG. 8 is a schematic diagram of field curvature and distortion of the camera optical lens shown in FIG. 5.
Figure 8:
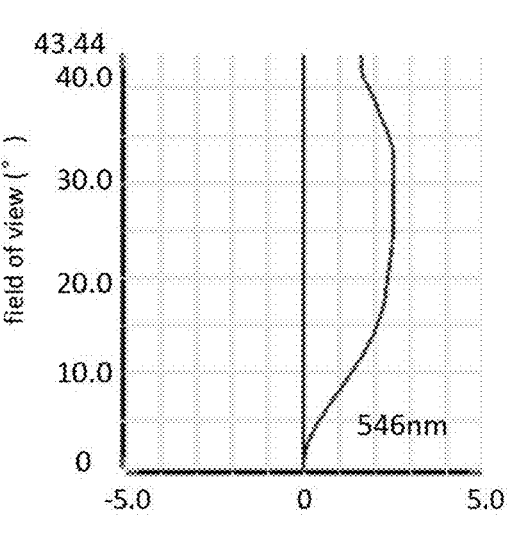

FIG. 6 and FIG. 7 respectively show longitudinal aberration and lateral color of light with wavelengths of 656 nm, 588 nm, 546 nm, 486 nm and 436 nm after passing through the camera optical lens 20 according to Embodiment 2. FIG. 8 shows field curvature and distortion of light with a wavelength of 546 nm after passing through the camera optical lens 20 according to Embodiment 2. The field curvature S in FIG. 8 is the field curvature in the sagittal direction, and T is the field curvature in the meridian direction.

In the embodiment, the entrance pupil diameter ENPD of the camera optical lens 20 is 4.679 mm, 1.0 field of view image height IH is 7.899 mm, the MIC field of view image height is 8.100 mm, the field of view FOV of the 1.0 field of view in a diagonal direction is 86.90°, the field of view FOV of the MIC field of view in a diagonal direction is 88.42°, the camera optical lens 20 meets the design requirements of miniaturization, wide-angle and the aberrations are sufficiently corrected and have excellent optical characteristics.

Embodiment 3

The meaning of the reference signs of Embodiment 3 is the same as that of Embodiment 1.

Figure 9:
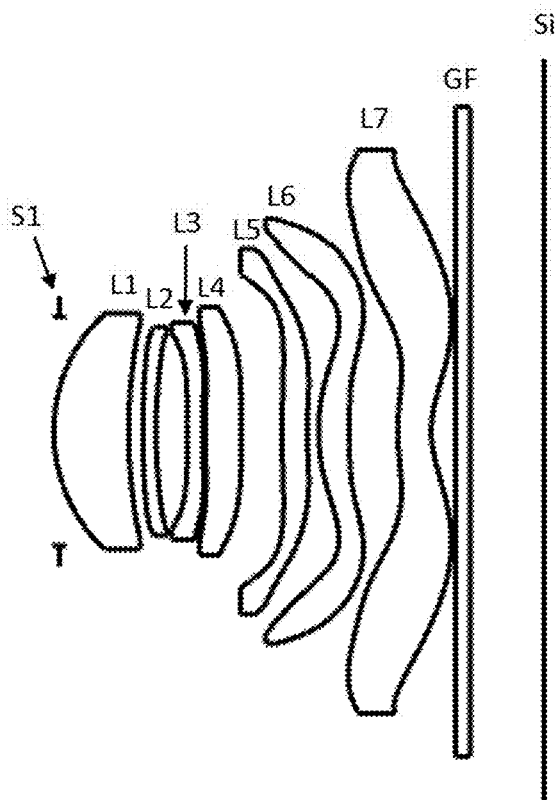
FIG. 9 is a structural schematic diagram of a camera optical lens according to Embodiment 3 of the present disclosure.

FIG. 9 shows a camera optical lens 30 according to Embodiment 3 of the present disclosure.

Table 5 and Table 6 show design data of the camera optical lens 30 according to the Embodiment 3 of the present disclosure.

TABLE 5

| | R | d | | nd | | vd |
|---|---|---|---|---|---|---|
| S1 | ∞ | d0= | −0.118 | | | |
| R1 | 3.516 | d1= | 1.577 | nd1 | 1.4959 v1 | 81.65 |
| R2 | 10.384 | d2= | 0.296 | | | |
| R3 | 13.588 | d3= | 0.281 | nd2 | 1.6700 v2 | 19.39 |
| R4 | 10.437 | d4= | 0.656 | | | |

TABLE 5-continued

| | R | d | | nd | | vd |
|---|---|---|---|---|---|---|
| R5 | −103.436 | d5= | 0.330 | nd3 | 1.6700 v3 | 19.39 |
| R6 | 25.856 | d6= | 0.057 | | | |
| R7 | 23.857 | d7= | 0.750 | nd4 | 1.5444 v4 | 55.82 |
| R8 | −223.720 | d8= | 0.859 | | | |
| R9 | 13.321 | d9= | 0.534 | nd5 | 1.5661 v5 | 37.71 |
| R10 | 8.657 | d10= | 0.253 | | | |
| R11 | 4.676 | d11= | 0.654 | nd6 | 1.5444 v6 | 55.82 |
| R12 | −63.717 | d12= | 1.013 | | | |
| R13 | 4.304 | d13= | 0.707 | nd7 | 1.5346 v7 | 55.69 |
| R14 | 2.091 | d14= | 0.518 | | | |
| R15 | ∞ | d15= | 0.310 | ndg | 1.5168 vg | 64.17 |
| R16 | ∞ | d16= | 1.552 | | | |

Table 6 shows aspheric surface data of each lens in the camera optical lens 30 according to Embodiment 3 of the present disclosure.

TABLE 6

| | Conic Coefficient | Aspheric Coefficient | | | | |
|---|---|---|---|---|---|---|
| | k | A4 | A6 | A8 | A10 | A12 |
| R1 | 2.2783E−01 | −1.8289E−03 | 3.7100E−03 | −4.5813E−03 | 3.0158E−03 | −1.1727E−03 |
| R2 | 6.2289E−01 | −1.0573E−03 | −2.2600E−03 | 3.6387E−03 | −2.9490E−03 | 1.3954E−03 |
| R3 | −1.7682E+01 | −4.3018E−03 | 1.6703E−03 | −1.4387E−03 | 1.3462E−03 | −7.1597E−04 |
| R4 | −8.9950E−01 | −4.3864E−03 | 3.0552E−03 | −3.9241E−03 | 3.8286E−03 | −2.2812E−03 |
| R5 | −1.1451E+01 | −4.7663E−03 | −5.1338E−03 | 2.0734E−03 | −1.2858E−03 | 6.0229E−04 |
| R6 | −4.4994E+01 | 5.3339E−03 | −1.4019E−02 | 6.6131E−03 | −2.4469E−03 | 6.7928E−04 |
| R7 | −9.9970E+00 | −6.6597E−04 | −8.0679E−03 | 1.7937E−03 | 5.4468E−04 | −4.3485E−04 |
| R8 | 1.0065E+03 | −1.1543E−02 | 1.6325E−03 | −1.6861E−03 | 8.8332E−04 | −2.6838E−04 |
| R9 | 3.4803E+00 | −1.6310E−02 | 1.3735E−03 | 3.0523E−03 | −2.2625E−03 | 7.3351E−04 |
| R10 | −2.0701E+00 | −2.0072E−02 | −1.5935E−02 | 1.5136E−02 | −7.3118E−03 | 2.4202E−03 |
| R11 | −9.0837E−01 | 3.0978E−02 | −2.2909E−02 | 9.6701E−03 | −3.3612E−03 | 8.6951E−04 |
| R12 | 1.2022E+02 | 4.5913E−02 | −7.0545E−03 | −2.1859E−03 | 1.1686E−03 | −2.6470E−04 |
| R13 | −1.4398E+00 | −4.9403E−02 | 7.6493E−03 | −1.1371E−03 | 1.4718E−04 | −1.2013E−05 |
| R14 | −1.0104E+00 | −6.5428E−02 | 1.4678E−02 | −2.9562E−03 | 4.6762E−04 | −5.5096E−05 |

| | Conic Coefficient | Aspheric Coefficient | | | | |
|---|---|---|---|---|---|---|
| | k | A14 | A16 | A18 | A20 | A22 |
| R1 | 2.2783E−01 | 2.7786E−04 | −3.9496E−05 | 3.0994E−06 | −1.0331E−07 | 0.0000E+00 |
| R2 | 6.2289E−01 | −4.0127E−04 | 6.8829E−05 | −6.3975E−06 | 2.4502E−07 | 0.0000E+00 |
| R3 | −1.7682E+01 | 2.2447E−04 | −4.1415E−05 | 4.3377E−06 | −2.0168E−07 | 0.0000E+00 |
| R4 | −8.9950E−01 | 8.3001E−04 | −1.8016E−04 | 2.1463E−05 | −1.0679E−06 | 0.0000E+00 |
| R5 | −1.1451E+01 | −1.9471E−04 | 3.8209E−05 | −3.7486E−06 | 1.3250E−07 | 0.0000E+00 |
| R6 | −4.4994E+01 | −1.2706E−04 | 1.4278E−05 | −6.9995E−07 | −1.4773E−09 | 0.0000E+00 |
| R7 | −9.9970E+00 | 1.3277E−04 | −2.3331E−05 | 2.2792E−06 | −9.4468E−08 | 0.0000E+00 |
| R8 | 1.0065E+03 | 5.1319E−05 | −5.9598E−06 | 3.6034E−07 | −7.4184E−09 | 0.0000E+00 |
| R9 | 3.4803E+00 | −7.9474E−05 | −3.0150E−05 | 1.5568E−05 | −3.5221E−06 | 4.8629E−07 |
| R10 | −2.0701E+00 | −5.8266E−04 | 1.0333E−04 | −1.3514E−05 | 1.2972E−06 | −9.0101E−08 |
| R11 | −9.0837E−01 | −1.6116E−04 | 2.1309E−05 | −2.0235E−06 | 1.3870E−07 | −6.8321E−09 |
| R12 | 1.2022E+02 | 3.7888E−05 | −3.7840E−06 | 2.7505E−07 | −1.4788E−08 | 5.8545E−10 |
| R13 | −1.4398E+00 | 4.6460E−07 | 7.5632E−09 | −1.9160E−09 | 1.1039E−10 | −3.6033E−12 |
| R14 | −1.0104E+00 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 2.2783E−01 | 0.0000E+00 | 0.0000E+00 | 0.0000E+00 | 0.0000E+00 | / |
| R2 | 6.2289E−01 | 0.0000E+00 | 0.0000E+00 | 0.0000E+00 | 0.0000E+00 | / |
| R3 | −1.7682E+01 | 0.0000E+00 | 0.0000E+00 | 0.0000E+00 | 0.0000E+00 | / |
| R4 | −8.9950E−01 | 0.0000E+00 | 0.0000E+00 | 0.0000E+00 | 0.0000E+00 | / |
| R5 | −1.1451E+01 | 0.0000E+00 | 0.0000E+00 | 0.0000E+00 | 0.0000E+00 | / |
| R6 | −4.4994E+01 | 0.0000E+00 | 0.0000E+00 | 0.0000E+00 | 0.0000E+00 | / |
| R7 | −9.9970E+00 | 0.0000E+00 | 0.0000E+00 | 0.0000E+00 | 0.0000E+00 | / |
| R8 | 1.0065E+03 | 0.0000E+00 | 0.0000E+00 | 0.0000E+00 | 0.0000E+00 | / |
| R9 | 3.4803E+00 | −4.3205E−08 | 2.4161E−09 | −7.7445E−11 | 1.0844E−12 | / |
| R10 | −2.0701E+00 | 4.4007E−09 | −1.4314E−10 | 2.7806E−12 | −2.4381E−14 | / |
| R11 | −9.0837E−01 | 2.3679E−10 | −5.5000E−12 | 7.7044E−14 | −4.9278E−16 | / |

TABLE 6-continued

| | | | | | | |
|---|---|---|---|---|---|---|
| R12 | 1.2022E+02 | -1.6627E-11 | 3.2029E-13 | -3.7388E-15 | 1.9892E-17 | / |
| R13 | -1.4398E+00 | 7.3592E-14 | -9.2830E-16 | 6.5709E-18 | -1.9645E-20 | / |
| R14 | -1.0104E+00 | -1.8904E-13 | 2.0927E-15 | -1.3728E-17 | 4.0356E-20 | / |

Figure 10:
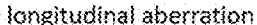
FIG. 10 is a schematic diagram of longitudinal aberration of the camera optical lens shown in FIG. 9.
Figure 10:
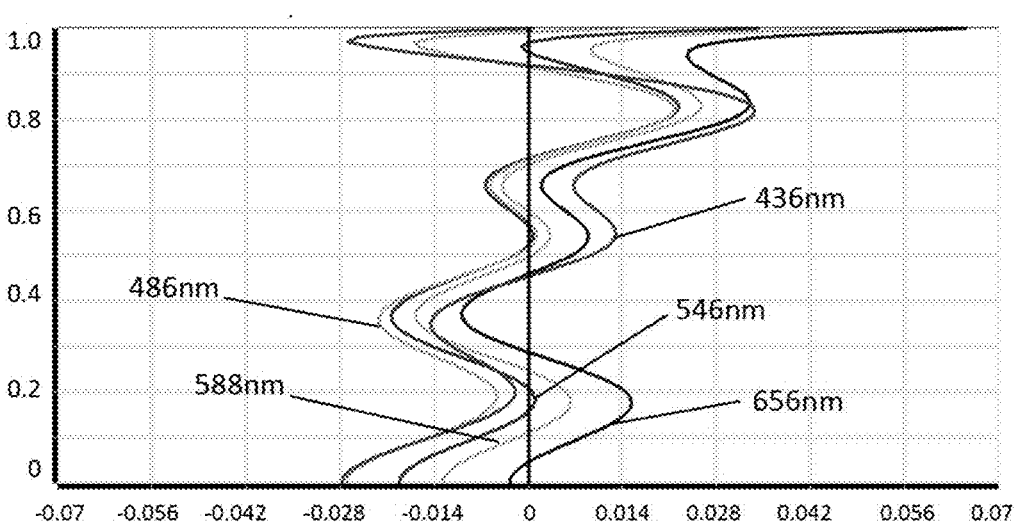
Figure 11:
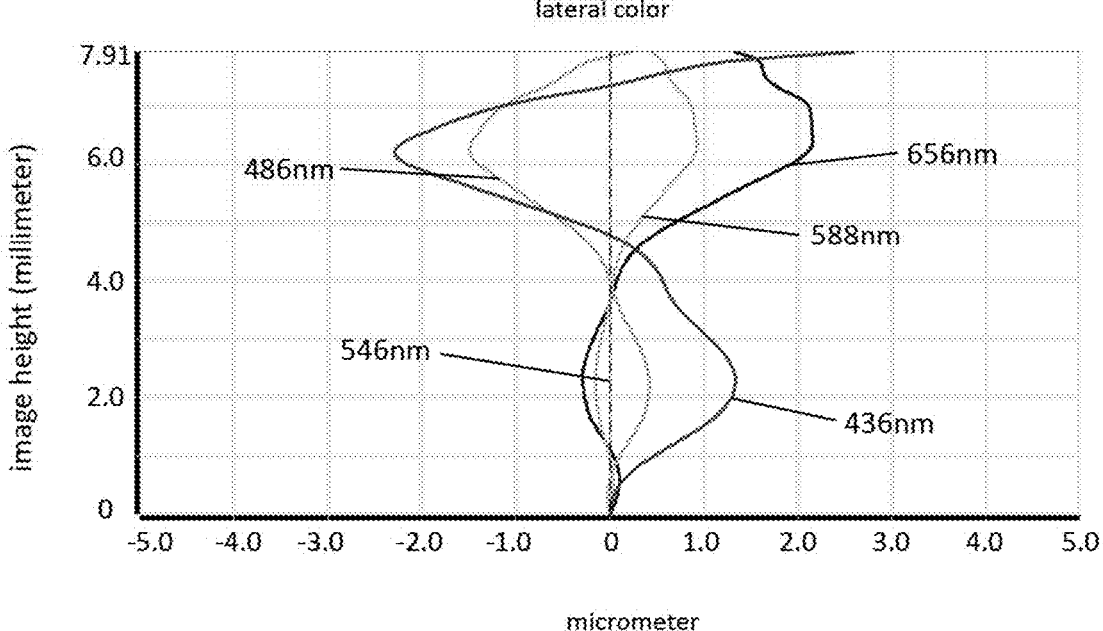
FIG. 11 is a schematic diagram of lateral color of the camera optical lens shown in FIG. 9.
Figure 12:
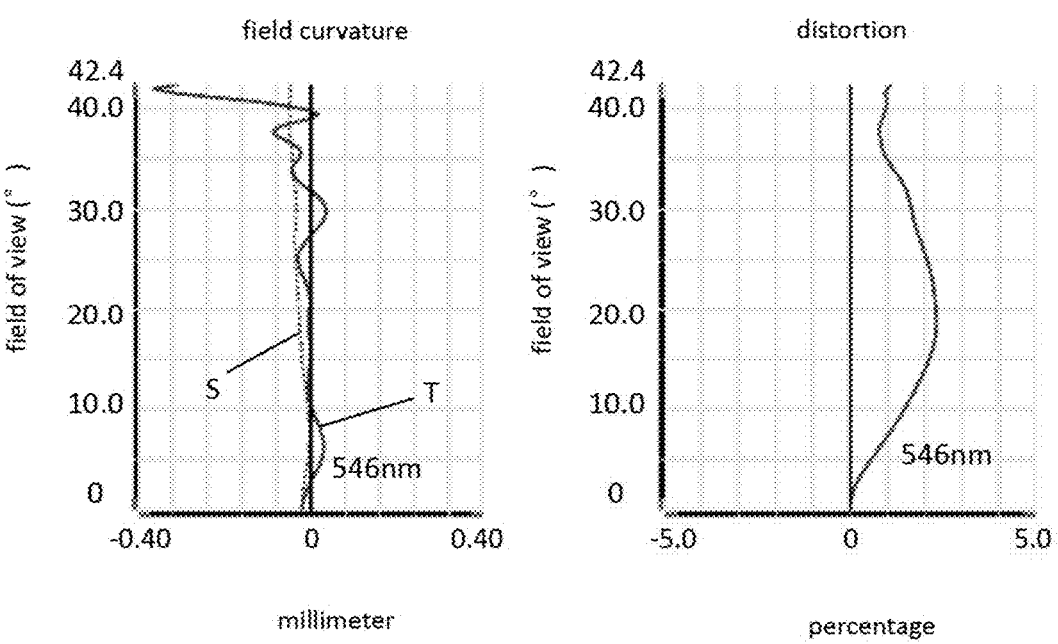
FIG. 12 is a schematic diagram of field curvature and distortion of the camera optical lens shown in FIG. 9.
Figure 13:
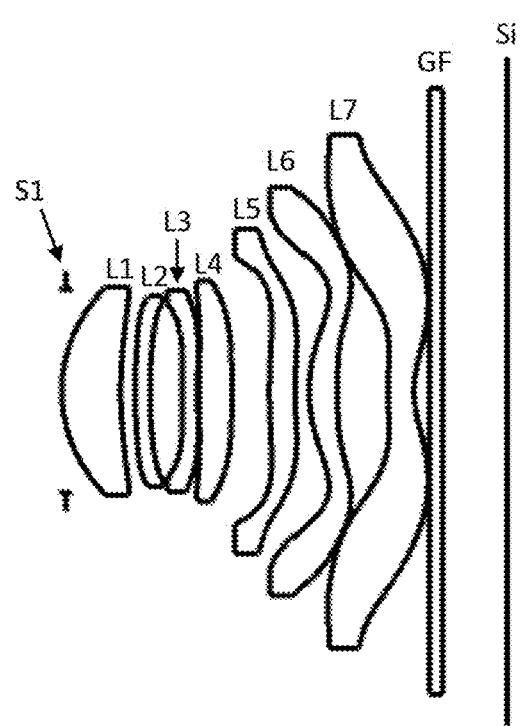
FIG. 13 is a structural schematic diagram of a camera optical lens according to Embodiment 4 of the present disclosure.

FIG. 10 and FIG. 11 respectively show longitudinal aberration and lateral color of light with wavelengths of 656 nm, 588 nm, 546 nm, 486 nm and 436 nm after passing through the camera optical lens 30 according to Embodiment 3. FIG. 12 shows field curvature and distortion of light with a wavelength of 546 nm after passing through the camera optical lens 30 according to Embodiment 3. The field curvature S in FIG. 12 is the field curvature in the sagittal direction, and T is the field curvature in the meridian direction.

In the embodiment, the entrance pupil diameter ENPD of the camera optical lens 30 is 4.885 mm, 1.0 field of view image height IH is 7.915 mm, the MIC field of view image height is 8.100 mm, the field of view FOV of the 1.0 field of view in a diagonal direction is 84.78°, the field of view FOV of the MIC field of view in a diagonal direction is 86.34°, the camera optical lens 30 meets the design requirements of miniaturization, wide-angle and the aberrations are sufficiently corrected and have excellent optical characteristics.

Embodiment 4

The meaning of the reference signs of Embodiment 4 is the same as that of Embodiment 1.

Table 7 and Table 8 show design data of the camera optical lens 40 according to Embodiment 4 of the present disclosure.

TABLE 7

| | R | | d | | nd | | vd |
|---|---|---|---|---|---|---|---|
| S1 | ∞ | d0= | -0.090 | | | | |
| R1 | 3.537 | d1= | 1.340 | nd1 | 1.4959 | v1 | 81.65 |
| R2 | 10.359 | d2= | 0.330 | | | | |
| R3 | 13.001 | d3= | 0.335 | nd2 | 1.6700 | v2 | 19.39 |
| R4 | 10.572 | d4= | 0.747 | | | | |
| R5 | -97.461 | d5= | 0.338 | nd3 | 1.6700 | v3 | 19.39 |
| R6 | 35.078 | d6= | 0.034 | | | | |
| R7 | 28.871 | d7= | 0.744 | nd4 | 1.5444 | v4 | 55.82 |
| R8 | -72.109 | d8= | 0.868 | | | | |
| R9 | 10.111 | d9= | 0.579 | nd5 | 1.5661 | v5 | 37.71 |
| R10 | 7.105 | d10= | 0.330 | | | | |
| R11 | 4.436 | d11= | 0.650 | nd6 | 1.5444 | v6 | 55.82 |
| R12 | -35.069 | d12= | 1.140 | | | | |
| R13 | 8.094 | d13= | 0.588 | nd7 | 1.5346 | v7 | 55.69 |
| R14 | 2.431 | d14= | 0.350 | | | | |
| R15 | ∞ | d15= | 0.310 | ndg | 1.5168 | vg | 64.17 |
| R16 | ∞ | d16= | 1.467 | | | | |

Table 8 shows aspheric surface data of each lens in the camera optical lens 40 according to Embodiment 4 of the present disclosure.

TABLE 8

| | Conic Coefficient | Aspheric Coefficient | | | | |
|---|---|---|---|---|---|---|
| | k | A4 | A6 | A8 | A10 | A12 |
| R1 | 0.0000E+00 | -1.1993E-03 | 3.6725E-03 | -4.5845E-03 | 3.0115E-03 | -1.1706E-03 |
| R2 | 0.0000E+00 | -2.0868E-03 | -2.4311E-03 | 3.6306E-03 | -2.9621E-03 | 1.4108E-03 |
| R3 | 0.0000E+00 | -6.1236E-03 | 1.9643E-03 | -1.8345E-03 | 1.6957E-03 | -8.3480E-04 |
| R4 | 0.0000E+00 | -4.3231E-03 | 2.8029E-03 | -3.7708E-03 | 3.8939E-03 | -2.2972E-03 |
| R5 | 0.0000E+00 | -5.8549E-03 | -4.7582E-03 | 2.0554E-03 | -1.4567E-03 | 7.0221E-04 |
| R6 | 0.0000E+00 | 4.4896E-03 | -1.3329E-02 | 6.5635E-03 | -2.4498E-03 | 6.8019E-04 |
| R7 | 0.0000E+00 | 1.4950E-03 | -8.5217E-03 | 2.5820E-03 | 4.0780E-04 | -4.5790E-04 |
| R8 | 0.0000E+00 | -1.1350E-02 | 1.9601E-03 | -1.7533E-03 | 9.0312E-04 | -2.7225E-04 |
| R9 | -1.0000E+00 | -1.6912E-02 | 1.3176E-03 | 3.0338E-03 | -2.2594E-03 | 7.3333E-04 |
| R10 | -1.0000E+00 | -1.9480E-02 | -1.6143E-02 | 1.5110E-02 | -7.3072E-03 | 2.4200E-03 |
| R11 | -1.0000E+00 | 3.0823E-02 | -2.2883E-02 | 9.6637E-03 | -3.3610E-03 | 8.6953E-04 |
| R12 | -1.0000E+00 | 4.6043E-02 | -7.0266E-03 | -2.1885E-03 | 1.1686E-03 | -2.6470E-04 |
| R13 | -1.0000E+00 | -4.8935E-02 | 7.7143E-03 | -1.1390E-03 | 1.4717E-04 | -1.2012E-05 |
| R14 | -1.0000E+00 | -6.4016E-02 | 1.4619E-02 | -2.9548E-03 | 4.6757E-04 | -5.5095E-05 |

| | Conic Coefficient | Aspheric Coefficient | | | | |
|---|---|---|---|---|---|---|
| | k | A14 | A16 | A18 | A20 | A22 |
| R1 | 0.0000E+00 | 2.7749E-04 | -3.9471E-05 | 3.0977E-06 | -1.0333E-07 | 0.0000E+00 |
| R2 | 0.0000E+00 | -4.0403E-04 | 6.8901E-05 | -6.4539E-06 | 2.5490E-07 | 0.0000E+00 |
| R3 | 0.0000E+00 | 2.5054E-04 | -4.4797E-05 | 4.4023E-06 | -1.8401E-07 | 0.0000E+00 |
| R4 | 0.0000E+00 | 8.3103E-04 | -1.8011E-04 | 2.1485E-05 | -1.0804E-06 | 0.0000E+00 |
| R5 | 0.0000E+00 | -2.1546E-04 | 3.9844E-05 | -3.8801E-06 | 1.4951E-07 | 0.0000E+00 |
| R6 | 0.0000E+00 | -1.2829E-04 | 1.4097E-05 | -6.4366E-07 | -1.8258E-09 | 0.0000E+00 |
| R7 | 0.0000E+00 | 1.3575E-04 | -2.1442E-05 | 1.8368E-06 | -6.6552E-08 | 0.0000E+00 |
| R8 | 0.0000E+00 | 5.1653E-05 | -5.9516E-06 | 3.5822E-07 | -7.6005E-09 | 0.0000E+00 |
| R9 | -1.0000E+00 | -7.9485E-05 | -3.0151E-05 | 1.5568E-05 | -3.5220E-06 | 4.8629E-07 |
| R10 | -1.0000E+00 | -5.8265E-04 | 1.0333E-04 | -1.3514E-05 | 1.2972E-06 | -9.0101E-08 |

TABLE 8-continued

| | | | | | |
|---|---|---|---|---|---|
| R11 | −1.0000E+00 | −1.6116E−04 | 2.1309E−05 | −2.0235E−06 | 1.3871E−07 | −6.8321E−09 |
| R12 | −1.0000E+00 | 3.7888E−05 | −3.7841E−06 | 2.7507E−07 | −1.4789E−08 | 5.8548E−10 |
| R13 | −1.0000E+00 | 4.6461E−07 | 7.5632E−09 | −1.9160E−09 | 1.1039E−10 | −3.6033E−12 |
| R14 | −1.0000E+00 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 0.0000E+00 | 0.0000E+00 | 0.0000E+00 | 0.0000E+00 | 0.0000E+00 | / |
| R2 | 0.0000E+00 | 0.0000E+00 | 0.0000E+00 | 0.0000E+00 | 0.0000E+00 | / |
| R3 | 0.0000E+00 | 0.0000E+00 | 0.0000E+00 | 0.0000E+00 | 0.0000E+00 | / |
| R4 | 0.0000E+00 | 0.0000E+00 | 0.0000E+00 | 0.0000E+00 | 0.0000E+00 | / |
| R5 | 0.0000E+00 | 0.0000E+00 | 0.0000E+00 | 0.0000E+00 | 0.0000E+00 | / |
| R6 | 0.0000E+00 | 0.0000E+00 | 0.0000E+00 | 0.0000E+00 | 0.0000E+00 | / |
| R7 | 0.0000E+00 | 0.0000E+00 | 0.0000E+00 | 0.0000E+00 | 0.0000E+00 | / |
| R8 | 0.0000E+00 | 0.0000E+00 | 0.0000E+00 | 0.0000E+00 | 0.0000E+00 | / |
| R9 | −1.0000E+00 | −4.3206E−08 | 2.4160E−09 | −7.7446E−11 | 1.0846E−12 | / |
| R10 | −1.0000E+00 | 4.4007E−09 | −1.4314E−10 | 2.7806E−12 | −2.4377E−14 | / |
| R11 | −1.0000E+00 | 2.3679E−10 | −5.5000E−12 | 7.7044E−14 | −4.9281E−16 | / |
| R12 | −1.0000E+00 | −1.6627E−11 | 3.2028E−13 | −3.7386E−15 | 1.9902E−17 | / |
| R13 | −1.0000E+00 | 7.3591E−14 | −9.2830E−16 | 6.5708E−18 | −1.9643E−20 | / |
| R14 | −1.0000E+00 | −1.8904E−13 | 2.0927E−15 | −1.3728E−17 | 4.0358E−20 | / |

Figure 14:
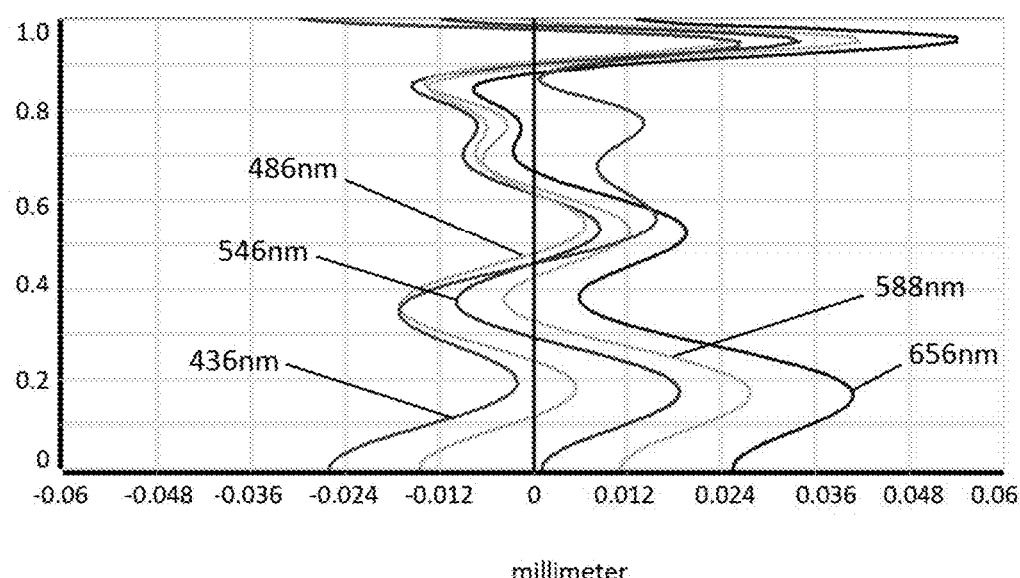
FIG. 14 is a schematic diagram of longitudinal aberration of the camera optical lens shown in FIG. 13.
Figure 15:
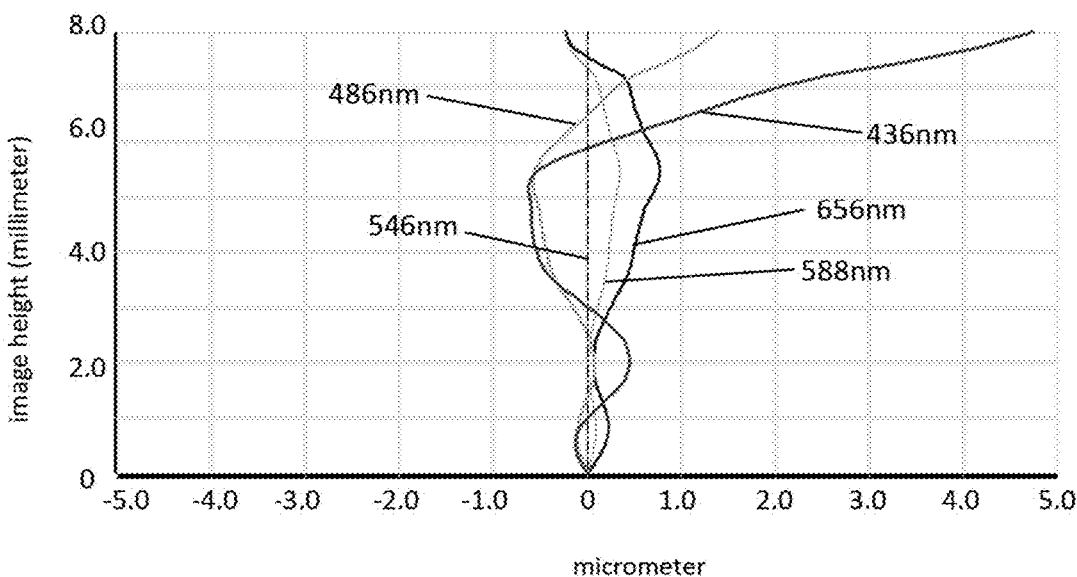
FIG. 15 is a schematic diagram of lateral color of the camera optical lens shown in FIG. 13.
Figure 16:
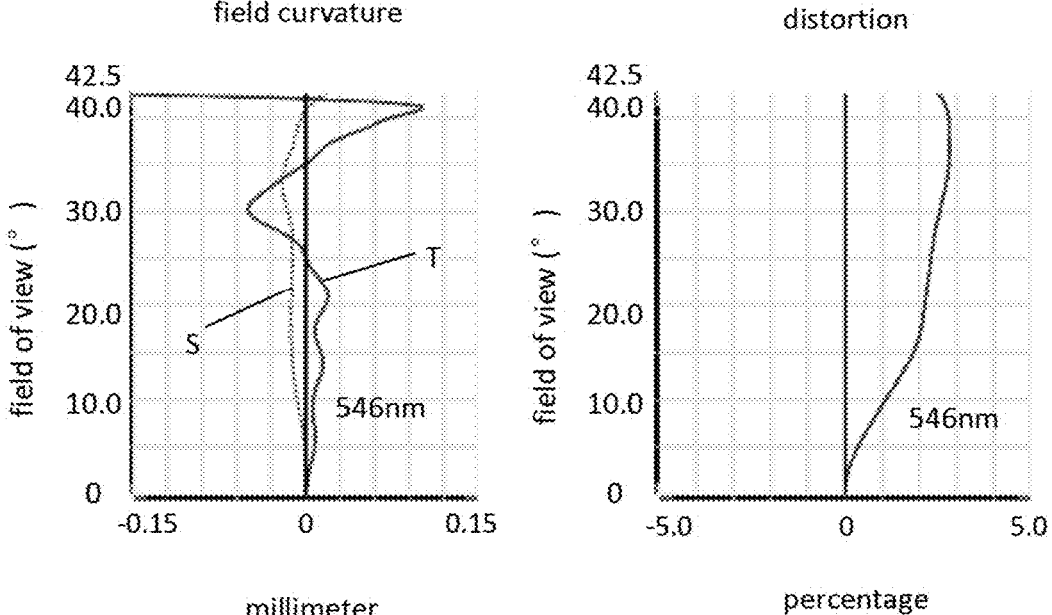
FIG. 16 is a schematic diagram of field curvature and distortion of the camera optical lens shown in FIG. 13.

FIG. 14 and FIG. 15 respectively show longitudinal aberration and lateral color of light with wavelengths of 656 nm, 588 nm, 546 nm, 486 nm and 436 nm after passing through the camera optical lens 40 according to Embodiment 4. FIG. 16 shows field curvature and distortion of light with wavelength 546 nm after passing through the camera optical lens 40 according to Embodiment 4, the field curvature S in FIG. 16 is the field curvature in the sagittal direction, and T is the field curvature in the meridian direction.

In the embodiment, the entrance pupil diameter ENPD of the camera optical lens 40 is 4.868 mm, 1.0 field of view image height IH is 8.000 mm, the MIC field of view image height is 8.290 mm, the field of view FOV of the 1.0 field of view in a diagonal direction is 84.97°, the field of view FOV of the MIC field of view in a diagonal direction is 87.18°, the camera optical lens 40 meets the design requirements of miniaturization, wide-angle and the aberrations are sufficiently corrected and have excellent optical characteristics.

Table 9 appears later to show values of various values in Embodiment 1, Embodiment 2, Embodiment 3 and Embodiment 4 corresponding to parameters specified in the conditional formula.

TABLE 9

| Parameters and Relational Expressions | Embodiment 1 | Embodiment 2 | Embodiment 3 | Embodiment 4 |
|---|---|---|---|---|
| f1/f + f2/f + f3/f | −14.630 | −9.379 | −10.455 | −13.642 |
| f4/f + f5/f + f6/f + f7/f | −0.702 | −1.494 | −0.742 | −1.080 |
| d0/d1 | −0.052 | −0.080 | −0.075 | −0.067 |
| R12/f6 | −7.998 | −2.506 | −7.970 | −4.604 |
| f4/f5 | −0.984 | −0.516 | −0.872 | −0.788 |
| (R9 + R10)/f | 1.705 | 2.584 | 2.571 | 2.021 |
| R13/R14 | 3.352 | 5.998 | 2.058 | 3.329 |
| f1/R1 + f1/R2 | 3.452 | 3.921 | 3.781 | 3.844 |
| (R13 + R14)/f | 1.270 | 2.166 | 0.748 | 1.236 |
| ΣD/Σd | 0.762 | 0.907 | 0.648 | 0.754 |
| f | 8.074 | 8.188 | 8.549 | 8.518 |
| f1 | 9.305 | 10.076 | 9.93 | 10.136 |
| f2 | −91.427 | −64.117 | −68.838 | −88.341 |
| f3 | −36.002 | −22.755 | −30.471 | −37.997 |
| f4 | 394.544 | 14.686 | 39.474 | 37.808 |
| f5 | −401.04 | −28.483 | −45.287 | −47.993 |
| f6 | 7.297 | 7.3 | 7.995 | 7.617 |

TABLE 9-continued

| Parameters and Relational Expressions | Embodiment 1 | Embodiment 2 | Embodiment 3 | Embodiment 4 |
|---|---|---|---|---|
| f7 | −6.47 | −5.738 | −8.523 | −6.635 |
| f12 | 10.047 | 11.4 | 11.127 | 11.063 |
| FNO | 1.750 | 1.750 | 1.750 | 1.750 |
| TTL | 9.862 | 9.738 | 10.347 | 10.150 |

Those skilled in the art may understand that the above embodiments are specific embodiments for implementing the present disclosure, and in practical applications, various changes may be made in form and detail without departing from the spirit and scope of the present disclosure.

What is claimed is:

1. A camera optical lens, comprising an aperture stop and seven lenses from an object-side to an image-side sequentially comprising:

a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

wherein an object-side surface of the first lens is convex in a paraxial region, and an image-side surface of the first lens is concave in the paraxial region; an object-side surface of the second lens is convex in a paraxial region, and an image-side surface of the second lens is concave in the paraxial region; an object-side surface of the third lens is concave in a paraxial region, and an image-side surface of the third lens is concave in the paraxial region; an object-side surface of the fourth lens is convex in a paraxial region; an object-side surface of the fifth lens is convex in the paraxial region, and an image-side surface of the fifth lens is concave in the paraxial region; an object-side surface of the sixth lens is convex in the paraxial region, and an image-side surface of the sixth lens is convex in the paraxial region; an object-side surface of the seventh lens is convex in the paraxial region, and an image-side surface of the seventh lens is concave in the paraxial region;

wherein, a focal length of the camera optical lens is f, a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, an on-axis distance from the aperture stop to the object-side surface of the first lens is do, an on-axis thickness of the first lens is d1, a central curvature radius of the object-side surface of the fifth lens in the paraxial region is R9, a central curvature radius of the image-side surface of the fifth lens in the paraxial region is R10, a central curvature radius of the image-side surface of the sixth lens in the paraxial region is R12, a central curvature radius of the object-side surface of the seventh lens in the paraxial region is R13, a central curvature radius of the image-side surface of the seventh lens in the paraxial region is R14, and following relational expressions are satisfied:

$$-18.000 \le f1/f + f2/f + f3/f \le -8.000;$$

$$-1.800 \le f4/f + f5/f + f6/f + f7/f \le -0.600;$$

$$-0.080 \le d0/d1 \le -0.050;$$

$$-8.000 \le R12/f6 \le -2.500;$$

$$-1.000 \le f4/f5 \le -0.500;$$

$$1.700 \le (R9 + R10)/f \le 2.600; \text{ and}$$

$$2.000 \le R13/R14 \le 6.000.$$

2. The camera optical lens as described in claim 1, wherein a following relational expression is satisfied: $-15.000 \le f1/f + f2/f + f3/f \le -9.000$.

3. The camera optical lens as described in claim 1, wherein a following relational expression is satisfied: $-1.500 \le f4/f + f5/f + f6/f + f7/f \le -0.700$.

4. The camera optical lens as described in claim 1, wherein an on-axis distance from the image-side surface of the fourth lens to the object-side surface of the fifth lens is d8, a total optical length from the object-side surface of the first lens to an image surface of the camera optical lens along an optic axis of the camera optical lens is TTL, where: $0.065 \le d8/TTL \le 0.120$.

5. The camera optical lens as described in claim 1, wherein the first lens is made of glass.

6. A camera optical lens, comprising an aperture stop and seven lenses from an object-side to an image-side sequentially comprising: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

an object-side surface of the first lens is convex in a paraxial region, and an image-side surface of the first lens is concave in the paraxial region; an object-side surface of the second lens is convex in a paraxial region, and an image-side surface of the second lens is concave in the paraxial region; an object-side surface of the third lens is concave in a paraxial region, and an image-side surface of the third lens is concave in the paraxial region; an object-side surface of the fourth lens is convex in a paraxial region; an object-side surface of the fifth lens is convex in a paraxial region, and an image-side surface of the fifth lens is concave in the paraxial region; an object-side surface of the sixth lens is convex in a paraxial region, and an image-side surface of the sixth lens is convex in the paraxial region; an object-side surface of the seventh lens is convex in the paraxial region, and an image-side surface of the seventh lens is concave in the paraxial region;

wherein a focal length of the camera optical lens is f, a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, an on-axis distance from the aperture stop to the object-side surface of the first lens is do, an on-axis thickness of the first lens is d1, a central curvature radius of the object-side surface of the first lens in the paraxial region is R1, a central curvature radius of the image-side surface of the first lens in the paraxial region is R2, a central curvature radius of the object-side surface of the seventh lens in the paraxial region is R13, a central curvature radius of the image-side surface of the seventh lens in the paraxial region is R14, a sum of the on-axis thicknesses of the first lens to the seventh lens is Σd, a sum of the lengths of the air gaps between any two adjacent lenses between the first lens to the seventh lens on the optical axis is ΣD, and following relational expressions are satisfied:

$$-18.000 \le f1/f + f2/f + f3/f \le -8.000;$$

$$-1.800 \le f4/f + f5/f + f6/f + f7/f \le -0.600;$$

$$-0.080 \le d0/d1 \le -0.050;$$

$$2.600 \le f1/R1 + f1/R2 \le 4.800;$$

$$0.600 \le (R13 + R14)/f \le 2.600; \text{ and}$$

$$0.600 \le \sum D / \sum d \le 0.950.$$

7. The camera optical lens as described in claim 6, wherein a following relational expression is satisfied: $-15.000 \le f1/f + f2/f + f3/f \le -9.000$.

8. The camera optical lens as described in claim 6, wherein a following relational expression is satisfied: $-1.500 \le f4/f + f5/f + f6/f + f7/f \le -0.700$.

9. The camera optical lens as described in claim 6, wherein a following relational expression is satisfied: $3.400 \le f1/R1 + f1/R2 \le 4.000$.

10. The camera optical lens as described in claim 6, wherein a following relational expression is satisfied: $0.700 \le (R13 + R14)/f \le 2.200$.

11. The camera optical lens as described in claim 6, wherein a following relational expression is satisfied: $0.630 \le \Sigma D / \Sigma d \le 0.920$.

12. The camera optical lens as described in claim 6, wherein a combined focal length of the first lens and the second lens is f12, a central curvature radius of the image-side surface of the second lens in the paraxial region is R4, and a following relational expression is satisfied: $-3.000 \le f12/(R1-R4) \le -1.300$.

13. The camera optical lens as described in claim 12, wherein a following relational expression is satisfied: $-2.600 \le f12/(R1-R4) \le -1.500$.

23

24

14. The camera optical lens as described in claim 6, wherein a following relational expression is satisfied: $0.007 \leq d0/(R1-R2) \leq 0.020$.

15. The camera optical lens as described in claim 14, wherein a following relational expression is satisfied: $0.008 \leq d0/(R1-R2) \leq 0.018$.

16. The camera optical lens as described in claim 6, wherein the first lens is made of glass.

* * * * *